(12) United States Patent
Liedtke (10) Patent No.: US 11,759,916 B2
(45) Date of Patent: Sep. 19, 2023

(54) PLIERS

(71) Applicant: KNIPEX-Werk C. Gustav Putsch KG, Wuppertal (DE)

(72) Inventor: Tim Liedtke, Solingen (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 419 days.

(21) Appl. No.: 17/050,218

(22) PCT Filed: Apr. 25, 2019

(86) PCT No.: PCT/EP2019/060598
§ 371 (c)(1),
(2) Date: Oct. 23, 2020

(87) PCT Pub. No.: WO2019/207034
PCT Pub. Date: Oct. 31, 2019

(65) Prior Publication Data
US 2021/0229243 A1   Jul. 29, 2021

(30) Foreign Application Priority Data
Apr. 26, 2018   (DE) ..................... 10 2018 110 107.4

(51) Int. Cl.
  *B25B 7/22*   (2006.01)
  *B25B 7/02*   (2006.01)
  (Continued)

(52) U.S. Cl.
  CPC .................. *B25B 7/22* (2013.01); *B25B 7/02* (2013.01); *B23D 29/023* (2013.01); *H01R 43/042* (2013.01)

(58) Field of Classification Search
  CPC .... B25B 7/22; B25B 7/14; B25B 7/02; B23D 29/02; B23D 29/023; B23D 33/02;
  (Continued)

(56) References Cited

U.S. PATENT DOCUMENTS 2,957,242 A * 10/1960 Buchalter ............ B23D 29/023
                                                              30/254
3,831,207 A *  8/1974 Boyajian .............. H02G 1/1214
                                                                D8/58
(Continued)

FOREIGN PATENT DOCUMENTS

DE   21 62 818 A1   6/1972
JP   H08-25232 A    1/1996

OTHER PUBLICATIONS

International Search Report of PCT/EP2019/060598, dated Sep. 26, 2019.

*Primary Examiner* — Robert J Scruggs
(74) *Attorney, Agent, or Firm* — Collard & Roe, P.C.

(57) ABSTRACT

Pliers include a first and a second plier limb which are rotatably held relative to one another about an axis of rotation in an articulation region and which form handle regions on one side of the articulation region and a jaw of the pliers on the other side, the plier limbs being designed to cut a threaded bolt in an overlap region, using first and second cavities that can be superposed in alignment. A thread is formed in each first cavity in order to cut a threaded bolt. The thread is provided over only part of the height of the first cavity and over only part of the inner circumference of the first cavity.

7 Claims, 10 Drawing Sheets (51) Int. Cl.
*B23D 29/02* (2006.01)
*H01R 43/042* (2006.01)

(58) Field of Classification Search
CPC .. B23D 33/04; H01R 43/042; H01R 43/0421; H02G 1/005; H02G 1/12; H02G 1/1236; H02G 1/1239; H02G 1/1246; B21F 1/002; B21F 1/003; B26B 17/00
See application file for complete search history.

(56) References Cited

U.S. PATENT DOCUMENTS

| | | | | |
|---|---|---|---|---|
| 4,271,593 | A | * 6/1981 | Smith | H02G 1/005 30/233 |
| 2012/0000019 | A1 | * 1/2012 | Steele | B25B 7/08 29/527.1 |

* cited by examiner

PLIERS

CROSS REFERENCE TO RELATED APPLICATIONS

This application is the National Stage of PCT/EP2019/060598 filed on Apr. 25, 2019, which claims priority under 35 U.S.C. § 119 of German Application No. 10 2018 110 107.4 filed on Apr. 26, 2018, the disclosure of which is incorporated by reference. The international application under PCT article 21(2) was not published in English.

TECHNICAL FIELD

The invention initially pertains to pliers with a first and a second plier limb, which are held rotatably relative to one another about an axis of rotation in an articulation region, wherein the plier limbs form handle regions on one side of the articulation region and a plier jaw on the other side, wherein said plier limbs are designed for shearing off a threaded bolt in an overlap region by means of first and second cavities that can be superimposed in alignment, and wherein a thread formation is in any case provided in a first cavity.

The invention furthermore pertains to pliers with a first and a second plier limb, which are held rotatably relative to one another about an axis of rotation in an articulation region, wherein the plier limbs form a handle regions on one side of the articulation region and a plier jaw on the other side, wherein said plier limbs are designed for shearing off, e.g., a bolt in an overlap region by means of first and second cavities that can be superimposed in alignment, and wherein the plier limbs lie on top of one another in a separating plane, in which the associated outer edges of the cavities can be moved toward one another for the separation.

PRIOR ART

Pliers of the type in question are known. In this context, we refer, for example, to patent application DE 21 62 818 A, which discloses multipurpose pliers with a plurality of cavities that are graduated with respect to their size and realized in the form of cutting openings. These cutting openings can be superimposed in alignment in the overlap region of the plier limbs. In order to cut bolts, e.g. threaded bolts, a shearing effect is exerted upon the bolt by means of the first and second cavities as a result of a conventional pivoting motion of the plier limbs.

In order to shear off threaded bolts, it is in this context furthermore known to realize at least one of the cavities with a corresponding internal thread.

U.S. Pat. No. 2,957,242 A discloses pliers, in which a wedge-like projection, the thickness of which increases over a circumferential angle and which extends over the entire circumference, is formed in a first cavity and associated with the separating plane. This projection limits the insertion region for a threaded bolt in the first place. JP H08-25232 A discloses pliers, in which the first cavity has a thread formation with multiple flights, which extend over the entire circumference of the cavity, wherein the thread formation is designed in cylindrical alignment with the cylindrical cavity. DE 21 62 818 A1 discloses pliers with bolt cutter openings that are realized in a thread-free manner.

SUMMARY OF THE INVENTION

In light of the above-described prior art, particularly with respect to U.S. Pat. No. 2,957,242 A, the invention is based on the objective of disclosing pliers that have a formation for separating a threaded bolt and provide favorable handling and/or an advantageous durability.

This objective is initially attained with according to the invention, in which it is proposed that two circumferentially opposite thread formations are provided and arranged offset in height, in that the thread formations are provided over only part of the inner circumference of the first cavity, and in that the thread formations extend with respect to a root of the thread in alignment with the axis of rotation.

An enhancement is achieved as a result of this design, particularly an enhancement with respect to the handling technology. As a result of the proposed design, a threaded bolt to be sheared off can be inserted into only the desired shearing position in an advantageous manner with respect to the handling technology. In this case, the screw bolt is captured by means of the partially provided thread formations in the region of the first cavity.

With respect to the thickness direction of the corresponding plier limb, which essentially extends in the direction of the axis of rotation, these thread formations may extend over less than 50 percent, preferably less than 25 or 20 percent, of this cavity length. In a potential embodiment, the thread formation may extend over between one-twentieth and one-fifth, for example over approximately one-tenth, of the cavity height.

These thread formations preferably are also provided only partially over the inner circumference of the first cavity, particularly over between one-eighth and seven-eighths, for example approximately over between one quarter and one half, of the inner circumference.

The above-defined objective is furthermore attained, according to another embodiment of the invention, in which it is proposed that both cavities are with respect to a cross section provided with a depression, which is aligned along the separating plane, opposite of the shearing region of the outer edge of the other cavity, and that the depressions are formed opposite of one another referred to a cross section such that the outer edges of the cavities, which form the cutting edges, are exposed in any pivoting position of the plier limbs.

The depressions may be realized in the form of forged depressions.

As the usage of the cavities for shearing off bolts progresses, so-called bulging of the cutting edges may occur in the region of the outer edges of the cavities. This can potentially affect the mobility of the pliers. The proposed design with the arrangement of a depression, which is aligned along the separating plane, counteracts this problem. A depression preferably is provided on the side of the outer edge of a cavity. Consequently, potential bulging of a cutting edge no longer affects the mobility, particularly when the pliers are opened.

The circumferentially opposite thread formations of the first cavity may be arranged offset in height and accordingly spaced apart from one another in the extending direction of the cavity. For example, the thread formations may be respectively associated with the end regions of the first cavity referred to the height direction.

The first cavity preferably is realized with a circular-cylindrical inner surface that has a geometric longitudinal cylinder axis.

In a projection, this geometric longitudinal cylinder axis may include an acute angle with the geometric axis of rotation of the plier limbs in the articulation region. According to a potential embodiment, this acute angle may amount to between 5 and 30° or between approximately 10 and 20°, e.g. to approximately 15°. Accordingly, the cylindrical inner surface of the first cavity extends at an acute angle to the separating plane.

The thread formations of the first cavity extend in alignment with the axis of rotation of the plier limbs. The insertion, in particular, of a threaded bolt to be sheared off is simplified as a result of this design in combination with the acutely angled inner surface of the first cavity. This threaded bolt does not have to be elaborately screwed into the first cavity over the entire thread length thereof and moved beyond this first cavity in order to be sheared off as it is the case in the prior art. As a result of the proposed solution, such a screw bolt can initially be inserted into the first cavity obliquely, i.e. by assuming an acute angle of the longitudinal bolt axis to the separating plane, wherein this accordingly takes place along the cylindrical and preferably completely thread-free inner surface. The engagement of the thread formations of the first cavity, which are arranged circumferentially opposite of one another and offset relative to one another in height, into the external thread of the screw bolt is achieved once the insertion depth is reached or the desired shear-off length is reached by setting the threaded bolt upright into a position, in which it extends perpendicular to the separating plane and therefore is aligned parallel with the axis of rotation.

The second cavity may have inner edges that extend differently of one another in a cross section, particularly a longitudinal cross section along a geometric longitudinal axis extending through the corresponding plier limb in the thickness direction. In this section, these inner edges lie opposite of one another, wherein the inner edges altogether form part of a circumferential inner surface of the second cavity.

In a projection, a first inner edge of the second cavity may extend in alignment with the axis of rotation or altogether essentially perpendicular to the separating plane. Accordingly, the first inner edge may furthermore extend such that it is adapted to the alignment of the thread formations in the first cavity.

According to a preferred embodiment, the second inner edge may include an acute angle between approximately 10 and 30°, e.g. between approximately 15 and 20°, with the axis of rotation. In a preferred embodiment, the corresponding acute angle may essentially correspond to the alignment of the longitudinal cylinder axis of the first cavity in the cylindrical, thread-free region.

The second cavity may also be free of thread formations. Once the shearing process is completed, the sheared-off bolt section lying in the region of the second cavity may, if applicable, fall out of the second cavity while the screw bolt section to be used further, which preferably also has a screw head or the like, is still held in the first cavity by means of the thread formations at least in its position, in which it is aligned perpendicular to the separating plane. The thread formations are disengaged from the screw thread of the bolt as this screw bolt section is displaced into the acutely angled position relative to the separating plane. The screw bolt can then be very easily pulled out of the first cavity.

The depression provided in the shearing region may furthermore be realized similar to an oblong hole. The outer edge or shearing edge of the opposite cavity in the opposite plier limb can move along this oblong hole-like depression without collision.

In a preferred embodiment, a depression is formed on both cavities. In this context, it is furthermore preferred that the depressions are with respect to a cross section formed opposite of one another such that their openings face one another.

In a preferred embodiment, each depression extends with respect to the axis of rotation at least essentially along a circular line in adaptation to the pivotability of the plier limbs about the axis of rotation, by means of which a bolt lying in the two cavities is also sheared off. The length of each depression in its extending direction corresponds at least to the dimension of the possible displacement travel of the opposite outer edge of the shearing region referred to the separating plane from the bolt receiving situation up to the shearing position.

With respect to the disclosure, the ranges or value ranges or multiple ranges indicated above and below also include all intermediate values, particularly in 1/10 increments of the respective dimension, but optionally also dimensionless. For example, the indication between 10 and 30° also includes the disclosure of between 10.1 and 30°, between 10 and 29.9°, between 10.1 and 29.9°, etc. The respective disclosure may on the one hand serve for defining a lower and/or upper limit of a cited range, but alternatively or additionally also for disclosing one or more singular values from a respectively indicated range.

BRIEF DESCRIPTION OF THE DRAWINGS

The invention is described in greater detail below with reference to the attached drawings that, however, merely show exemplary embodiments. A component, which is described with reference to one of the exemplary embodiments and not replaced with a different component in another exemplary embodiment, is therefore also described as a potentially existing component in this other exemplary embodiment. In the respective drawings.

DESCRIPTION OF THE EMBODIMENTS

Figure 1:
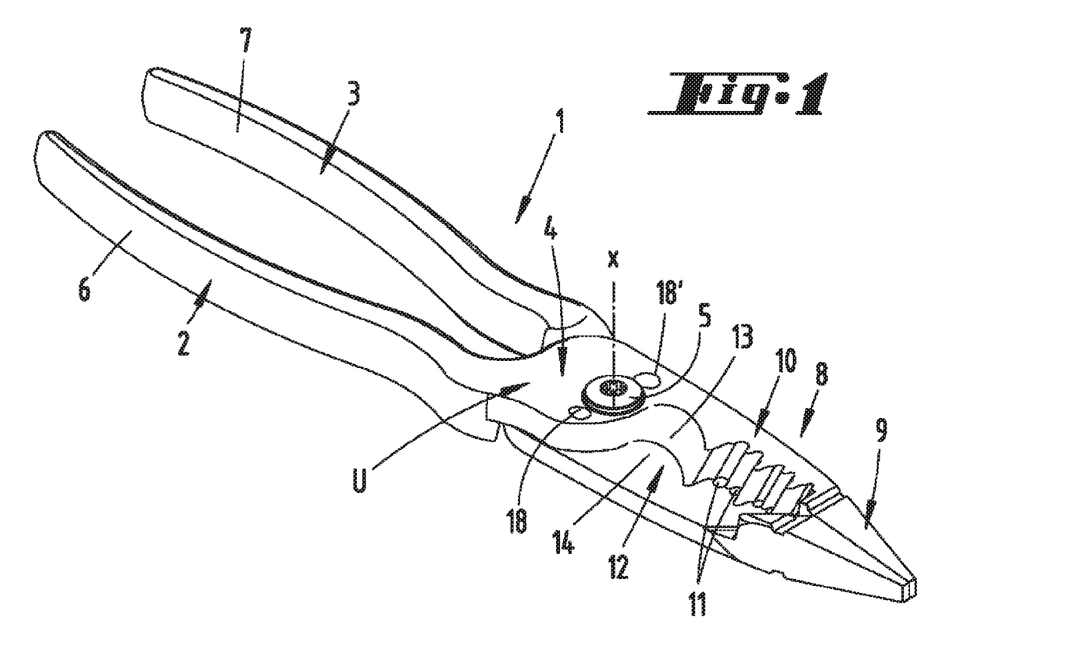
FIG. 1 shows a perspective representation of pliers in the closed position concerning a first embodiment.
Figure 2:
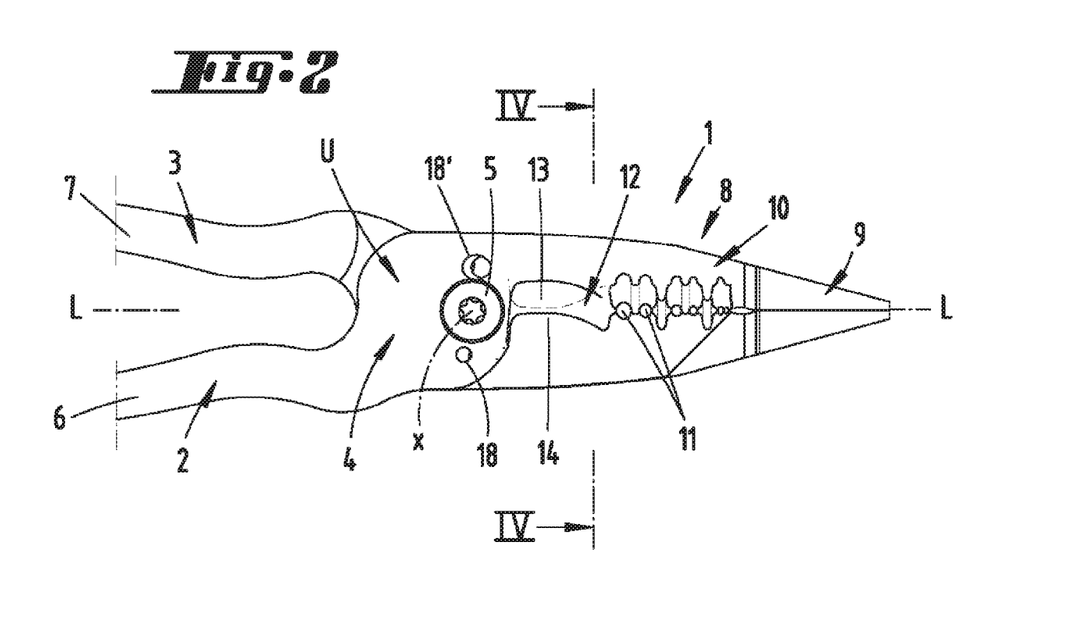
FIG. 2 shows a partial representation of the pliers in the form of a top view.
Figure 3:
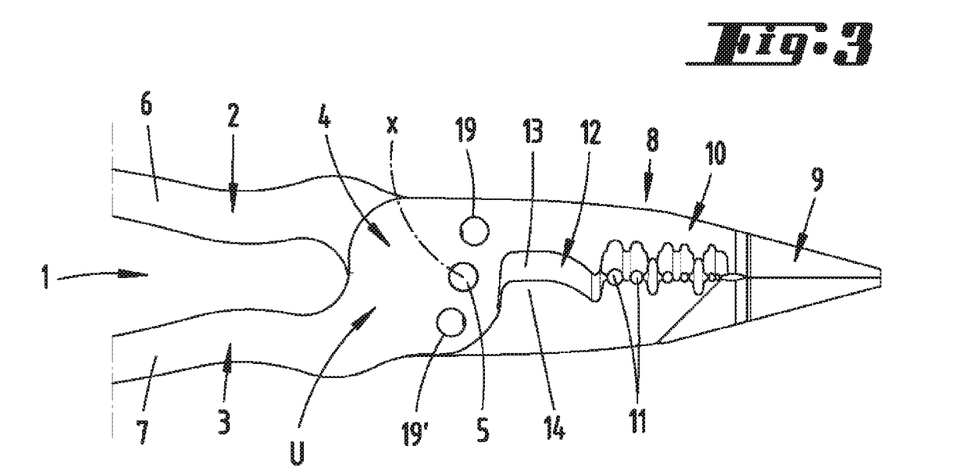
FIG. 3 shows a rear view of FIG. 2.
Figure 4:
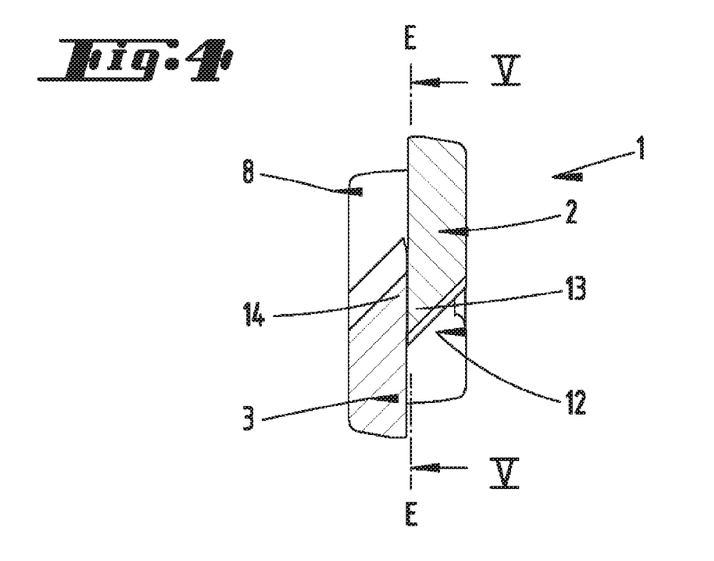
FIG. 4 shows a section along the line IV-IV in FIG. 2.

Pliers 1 with two plier limbs 2 and 3, which are only partially illustrated, e.g., in FIG. 2, are initially described below with reference to FIG. 1, wherein said plier limbs are held rotatably relative to one another about a geometric axis of rotation x in an articulation region 4. The geometric axis of rotation x is defined by an articulation pin 5 that extends through the plier limbs 2 and 3 in the articulation region 4.

The first plier limb 2 forms a handle region 6 and the second plier limb 3 forms a handle region 7 on one side of the articulation region 4 whereas a plier jaw 8 is formed on the other side of the articulation region 4.

According to the first exemplary embodiment illustrated in FIGS. 1 to 12, the plier jaw 8 specifically may have different functional regions that are formed behind one another, i.e. referred to a longitudinal line L-L. For example, a flat jaw region 9 may be formed on the side of the tip, i.e. on the free ends of the plier limbs 2 and 3.

The plier jaw 8 may have a cutting region 12 near the articulation, wherein said cutting region has a first cutting edge 13 on the first plier limb 2 and a second cutting edge 14 on the second plier limb 3.

According to the first exemplary embodiment, a stripping region 10 may furthermore be provided between the cutting region 12 and the flat jaw region 9, wherein said stripping region comprises cutting formations 11 with different diameters in order to make it possible to strip wires with different cross sections.

Figure 13:
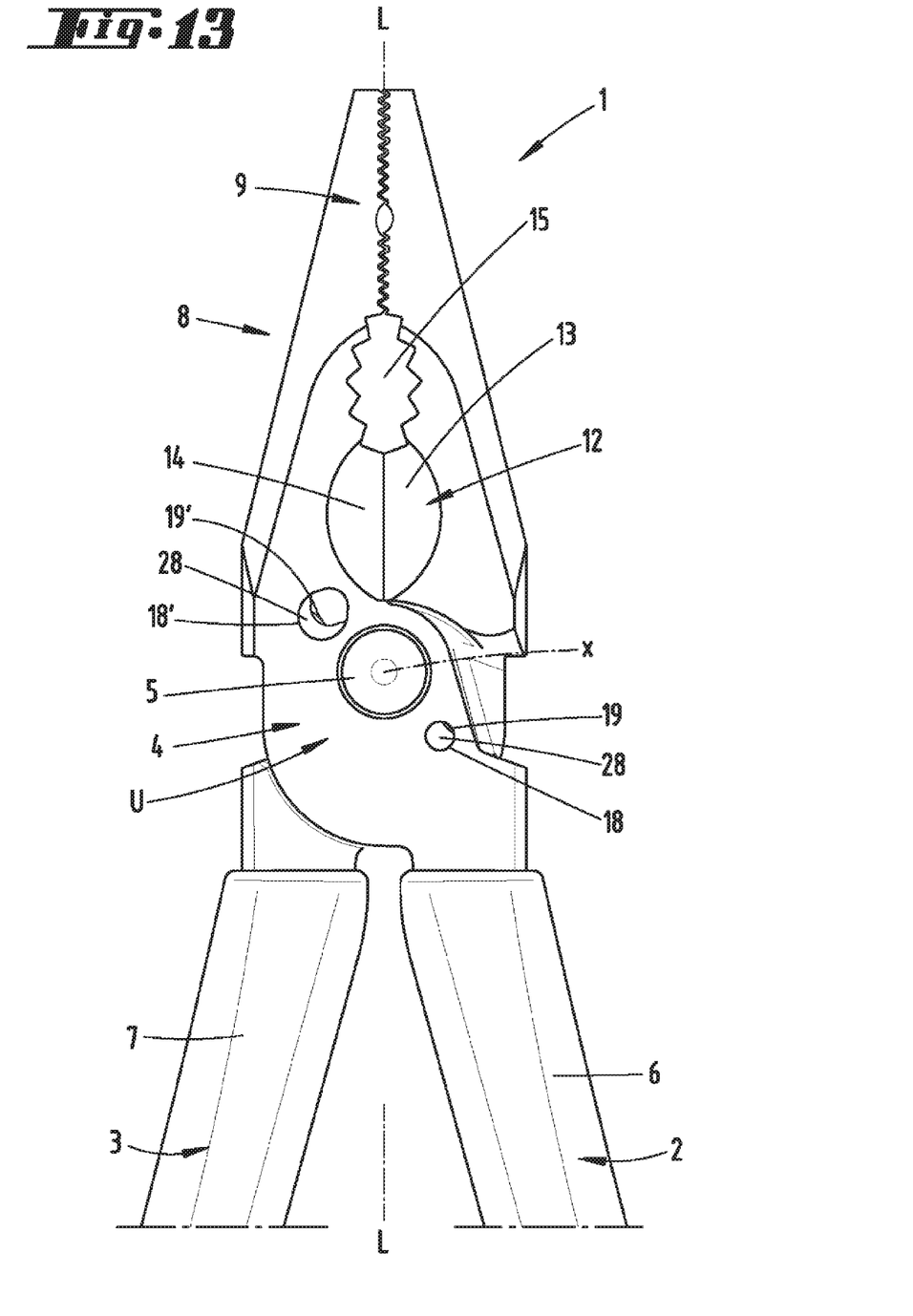
FIG. 13 shows a partial view of pliers according to another embodiment concerning the closed position.

According to the illustrations in FIGS. 13 to 16, the pliers 1 may also be realized in the form of so-called universal pliers, e.g. as illustrated in FIG. 13, wherein said universal pliers have a cutting region 12 and a flat jaw region 9, as well as a burner hole 15 formed between these regions.

Figure 14:
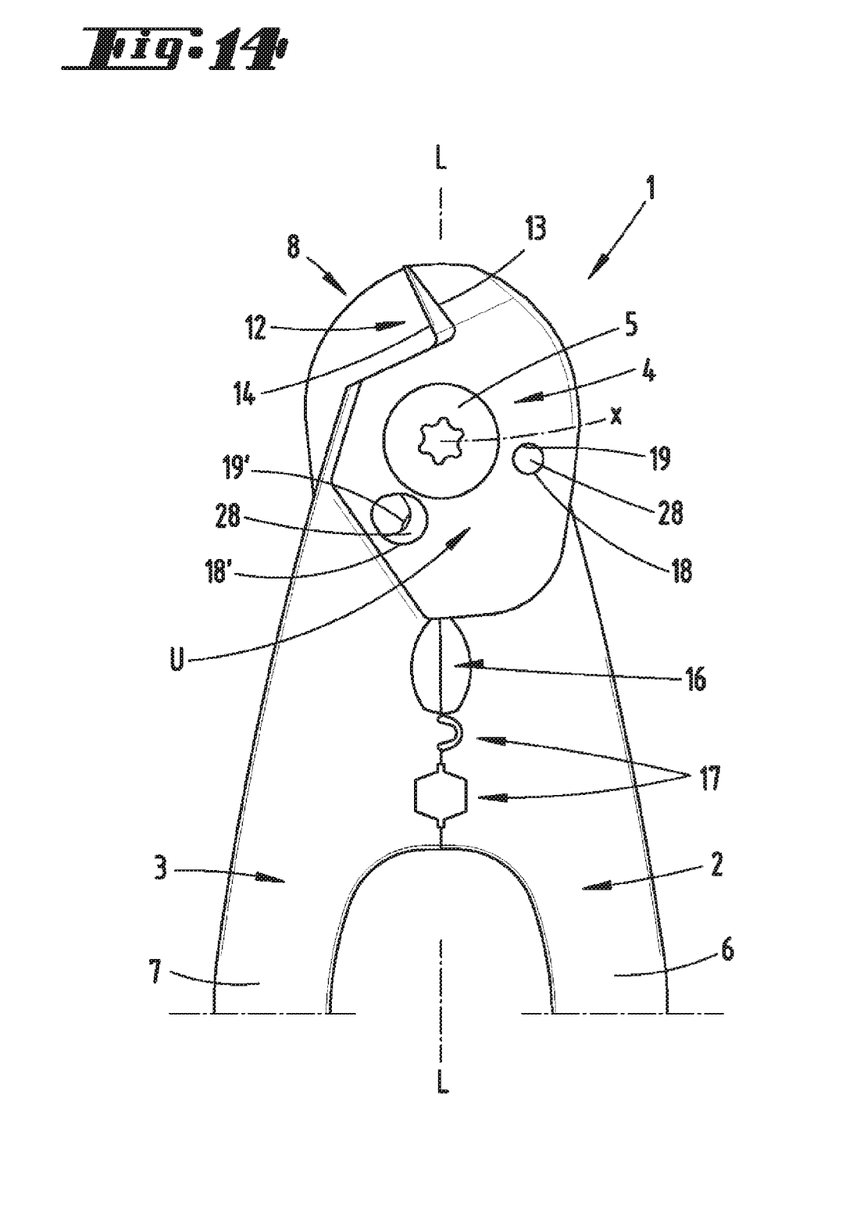
FIG. 14 shows another partial view of pliers according to a third embodiment concerning the closed position.

According to the illustration in FIG. 14, the pliers 1 may also be realized in the form of wire rope cutters with a first cutting region 12, which lies opposite of the handle regions 6 and 7 referred to the axis of rotation x, and a second cutting region 16, which is formed between the handle regions 6 and 7 near the articulation. In this embodiment, multiple crimping regions, in this case two crimping regions 17, may furthermore be provided along the longitudinal axis L-L.

Figure 15:
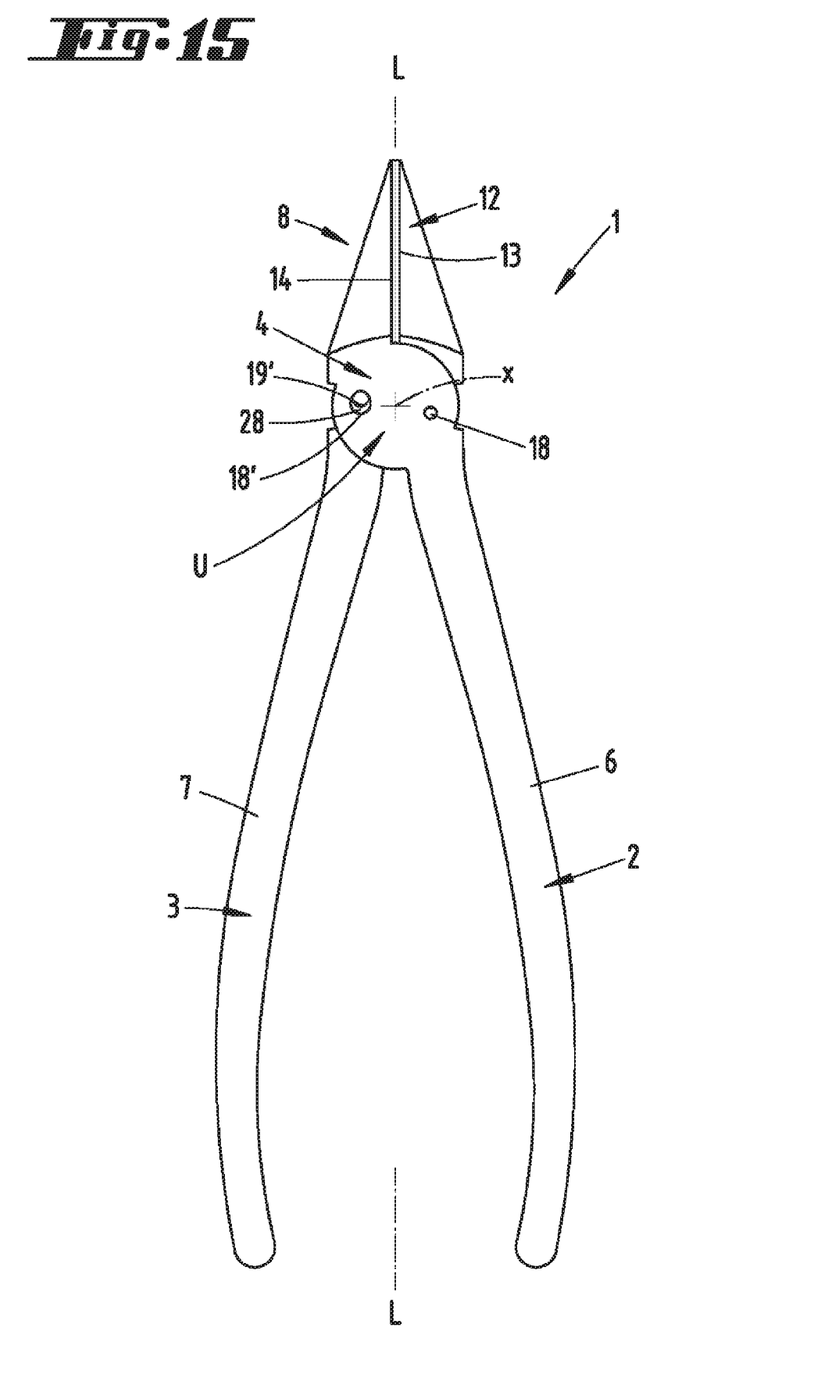
FIG. 15 shows a view of pliers according to a fourth embodiment in the closed position.

FIG. 15 shows pliers 1 in the form of cutting pliers, which accordingly have a cutting region 12.

Figure 16:
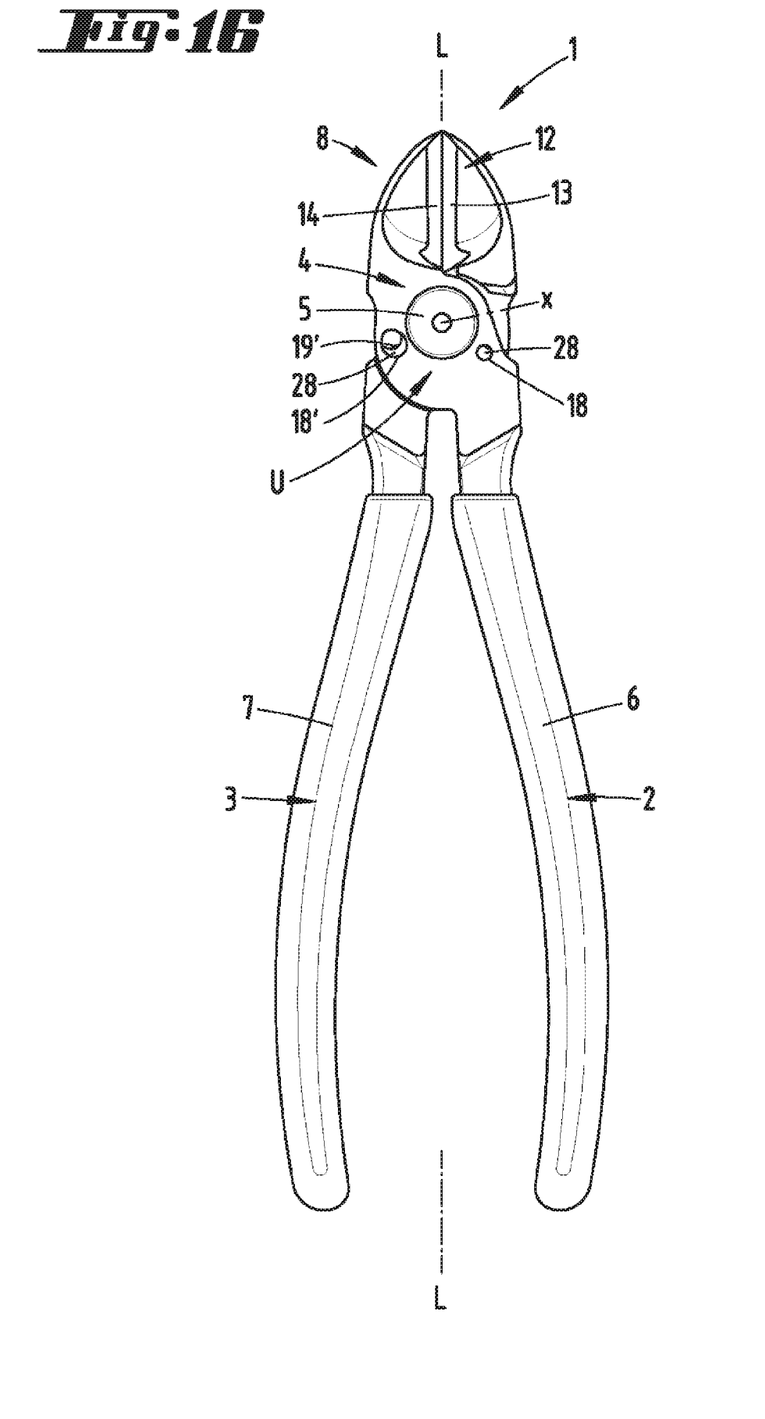
FIG. 16 shows a view of pliers according to a fifth embodiment concerning the closed position.

Pliers 1 in the form of side cutters are illustrated in FIG. 16.

Furthermore, the pliers 1 may also be realized in the form of any gripping pliers, center or front cutting pliers, stripping pliers, cable pliers, crimping pliers or also wire strippers. The pliers 1 particularly may be realized in the form of pliers or shears, in which the plier limbs 2 and 3 overlap in the articulation region 4 in any pivoting position of the plier limbs.

In the exemplary embodiments shown, each plier limb 2, 3 is provided with bore-like cavities in an overlap region U of the plier limbs 2 and 3, which essentially corresponds to the articulation region 4, wherein said cavities extend completely through the respective plier limb 2, 3 in the thickness direction, i.e. in essentially the extending direction of the axis of rotation x.

With respect to an outline, e.g. according to the illustration in FIG. 2, the two first cavities 18 and 18' in the first plier limb 2, as well as the two second cavities 19 and 19' in the second plier limb 3, approximately lie diametrically opposite of one another referred to the axis of rotation x. Furthermore, these cavities 18, 18' and 19, 19' are arranged radially outside the articulation pin 5, but adjacent thereto.

During a pivoting motion of a plier limb 2, 3, the cavities 18, 18' and 19, 19' formed therein move along a circular line referred to the axis of rotation x.

The cavities 18 and 19, as well as the other cavities 18' and 19', essentially can be superimposed in alignment in a direction, which is essentially oriented in the extending direction of the axis of rotation x, by pivoting the plier limbs accordingly. In the exemplary embodiment shown, this superimposed position preferably is an open position of the plier jaw according to the illustrations in FIGS. 5 and 6.

In this open position of the plier jaw or in this overlap position of the first cavity 18, 18' and the second cavity 19, 19', a bolt 20 to be cut to length can be inserted through these cavities starting from the exposed surface of the first plier limb 2. The free end of the bolt 20 may emerge on the underside of the second plier limb 3 through the correspondingly provided second cavities 19, 19' or extend in the region of the respective cavity 19 or 19'.

The design and the arrangement of the cavities serves for shearing off a bolt 20, for example a bolt 20 with an external thread 21. The shearing plane or separating plane E extends between the planar surfaces of the plier limbs 2 and 3, which lie on top of one another in the articulation region 4, wherein the separating plane E simultaneously also forms the cutting plane of the cutting region 12 if such a cutting region is provided. The separating plane E therefore extends perpendicular to the axis of rotation x.

With respect to their respective cross-sectional design, the pairs of cavities 18, 19 and 18', 19' are adapted for shearing off bolts with different diameters.

The cavities of a pair of cavities (18 and 19 or 18' and 19') are furthermore designed differently.

Figures 5, 6:
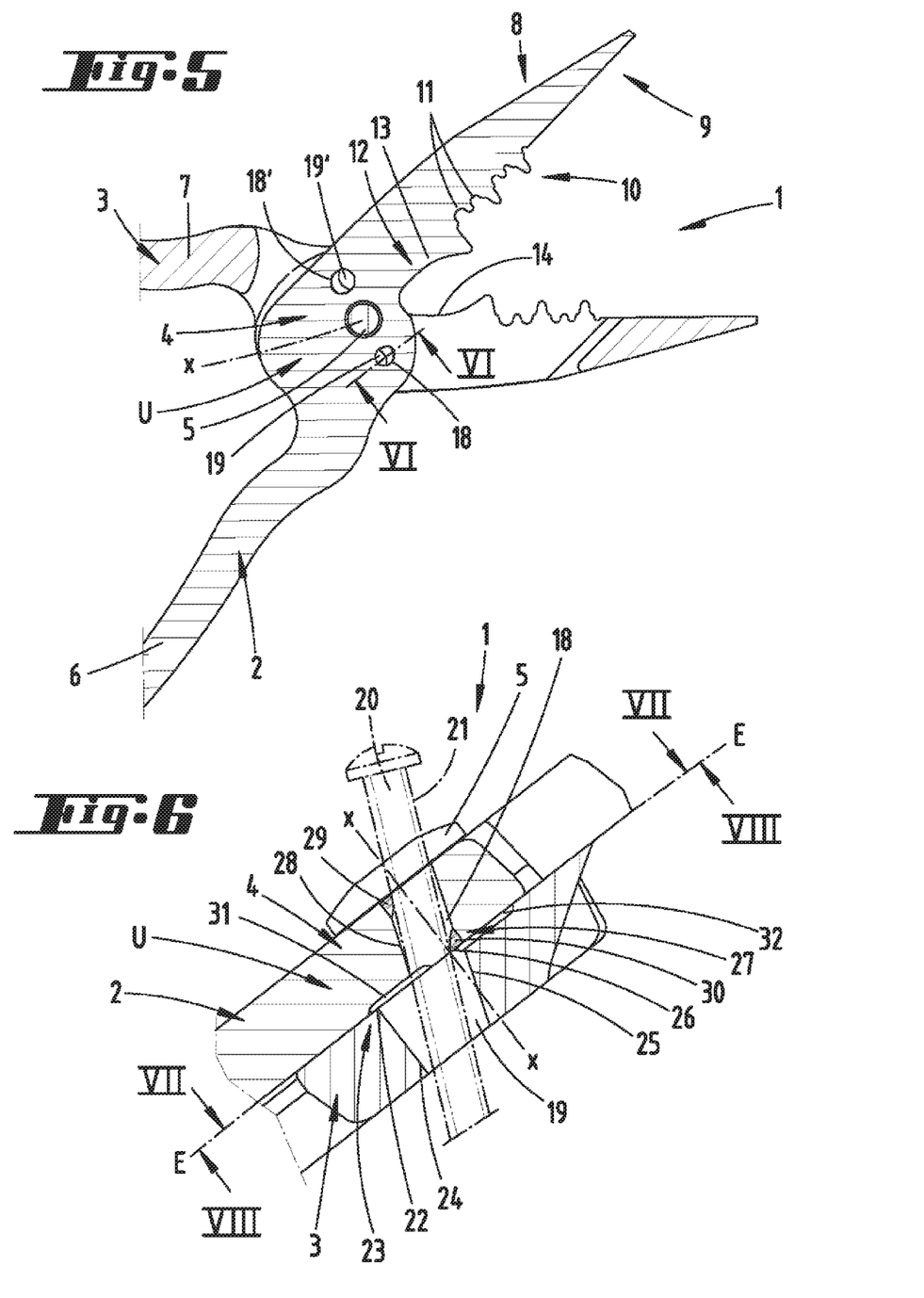
FIG. 5 shows a section along the line V-V in FIG. 4 concerning a bolt receiving position.
FIG. 6 shows an enlarged section along the line VI-VI in FIG. 5.
Figure 7:
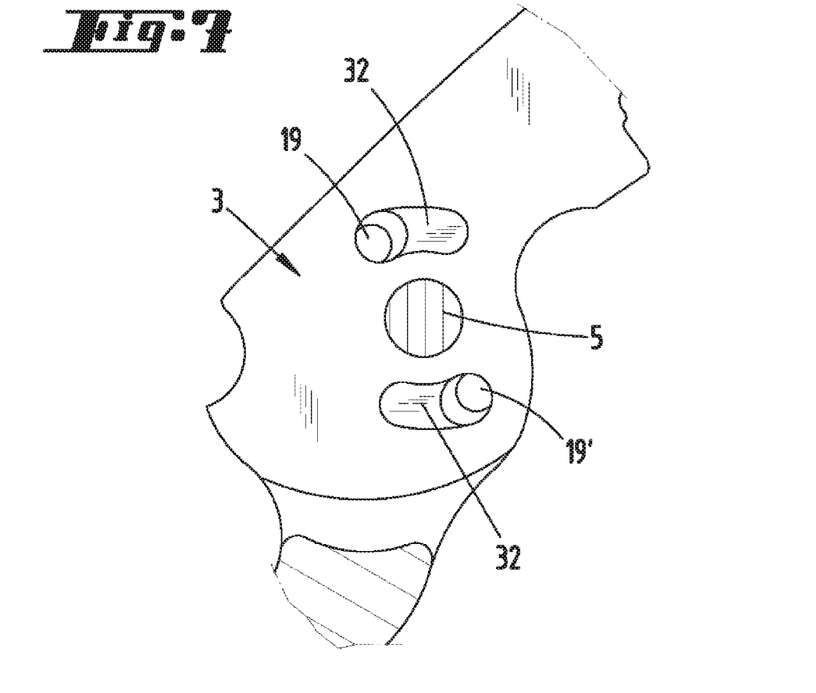
FIG. 7 shows a section along the line VII-VII in FIG. 6.
Figure 8:
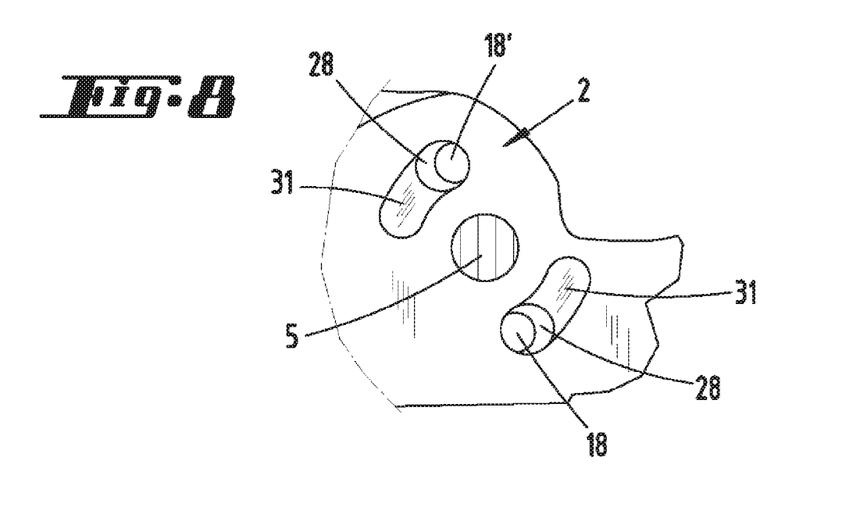
FIG. 8 shows a section along the line VIII-VIII in FIG. 6.

With respect to a cross section according to FIG. 6, in which the axis of rotation x is illustrated in the form of a line, the respective second cavity 19 or 19' of the second plier limb 3 widens in a funnel-shaped manner in the direction of the separating plane E starting from the exposed outer surface of the second plier limb 3. In this case, a first inner edge 24, which in the separating plane E essentially forms the associated outer edge 22 in the second shearing region 23, is essentially aligned in parallel with the axis of rotation x or aligned perpendicular to the separating plane E whereas the second inner edge 25, which essentially lies opposite in this section, includes an acute angle α between approximately 15 and 20° with the axis of rotation x or a line extending in parallel with the axis of rotation x, respectively. This second inner edge 25 essentially faces the outer edge 26 in the first shearing region 27 of the associated first cavity 18 or 18'.

The respective first cavity 18 or 18' initially has an essentially cylindrical inner surface 28 with a longitudinal cylinder axis y, which likewise includes an acute angle β with the axis of rotation x and therefore is acutely angled relative to the separating plane E as it is also the case with the second inner edge 25 of the respective second cavities 19 or 19'.

The diameter dimension in the region of the cylindrical inner surface 28 measured transverse to the longitudinal cylinder axis y may approximately correspond to between 0.4-times and 0.7-times, e.g. approximately 0.5-times, the opening dimension of the respective second cavity 19 or 19' in the region of the separating plane E, wherein said opening dimension refers to a cross section according to FIG. 6.

The respective first cavity 18 or 18' furthermore has two thread formations 29 and 30, which are spaced apart from one another with respect to the height h of the first cavity 18 or 18' and essentially arranged circumferentially opposite of one another. One thread formation 29 faces the exit region of the respective first cavity 18 or 18' whereas the second thread formation 30 is formed on the end of the first cavity 18, 18' in the region of the separating plane E.

The thread formations 29 and 30 extend with respect to a respective root of the thread essentially in alignment with the axis of rotation x and therefore essentially in perpendicular alignment to the separating plane E.

The clear inside diameter of the first cavity 18, 18' in the region of the cylindrical inner surface 28 may be chosen larger than the outside diameter of the bolt 28 to be sheared off by a factor between approximately 1.1 and 1.2. If this bolt is realized in the form of a screw bolt, in particular, it can initially be inserted into the superimposed pair of cavities in acutely angled alignment to the separating plane E in order to be cut to length as illustrated in the figures (compare to FIG. 6). As a result of this acutely angled alignment of the bolt 20 relative to the separating plane E, it can also be easily inserted through the respective first cavity 18 or 18' with of the thread formations 29 and 30 because these thread formations 29 and 30 (initially) do not come into engagement due to the acutely angled alignment of the bolt 20.

Subsequently, the bolt 20 is set upright into a position according to the illustration in FIG. 9, in which it is oriented perpendicular to the separating plane E, manually or solely as a result of a corresponding pivoting motion of the plier limbs 2 and 3 in the direction of a closed position of the plier jaw. In this position, the bolt 20 is supported as a result of an engagement of its external thread in the region of the thread formations 29 and 30 whereas the remaining external thread section of the bolt 20 extends freely within the respective cavity 18 or 18'. The support in the region of the respective first cavity 18 or 18' preferably is only achieved in the region of the thread formations 29 and 30.

Figure 9:
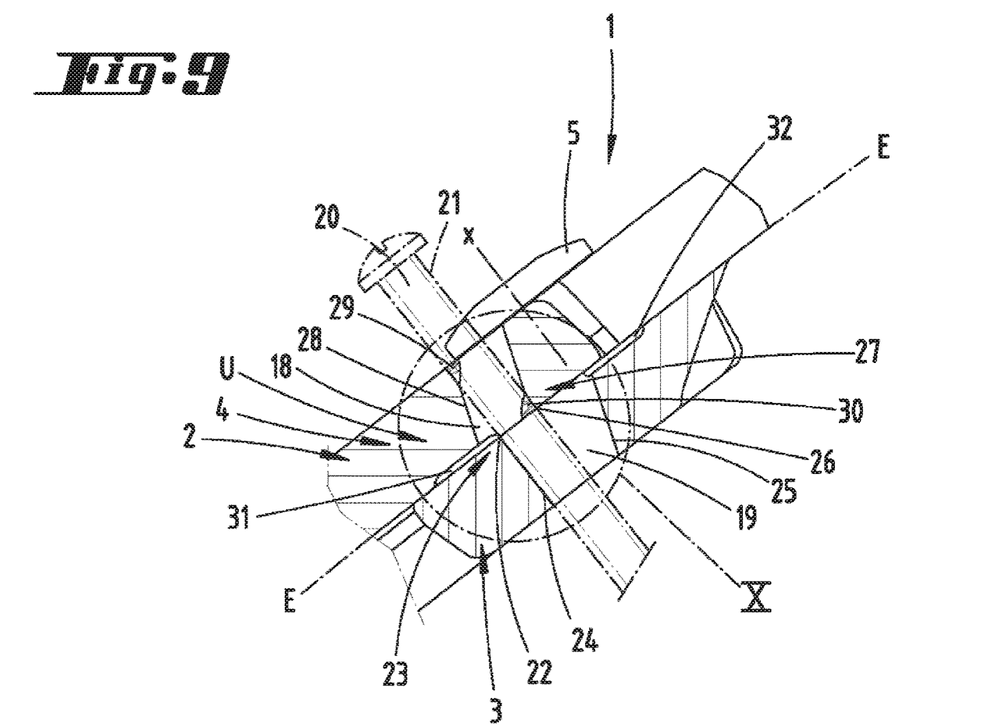
FIG. 9 shows a sectional representation corresponding to FIG. 6 and concerning a follow-up representation to FIG. 6 in the course of shearing off a bolt.
Figure 10:
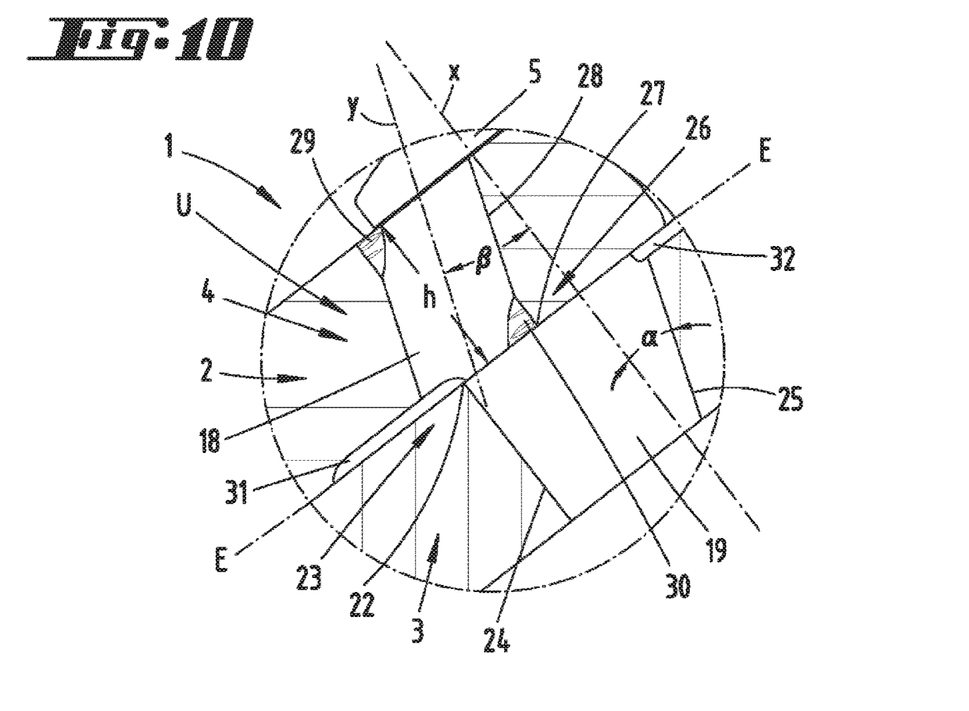
FIG. 10 shows an enlarged detail of the region X in FIG. 9.
Figure 11:
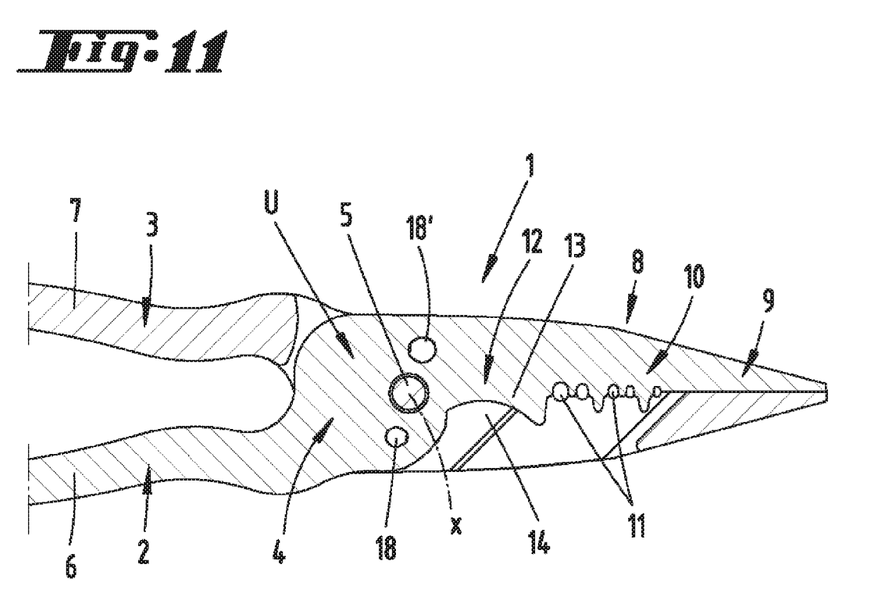
FIG. 11 shows a representation corresponding to FIG. 5, however, concerning the plier position after the completion of the shearing process.
Figure 12:
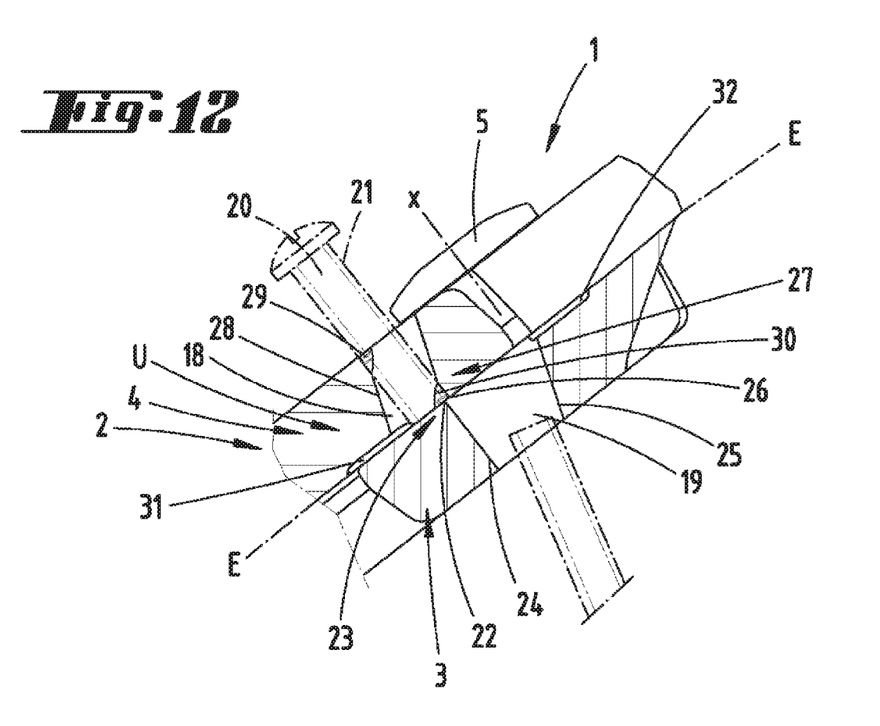
FIG. 12 shows a follow-up representation to FIG. 9 concerning the completed shearing process according to FIG. 11.

In the course of the further displacement of the plier limbs and 2 and 3, the bolt 20 reaches a position, in which the section of the bolt 20 to be cut to length comes with respect to a cross section according to FIG. 9 in contact with the first inner edge 24 in the region of the respective second cavity 19 or 19'. This contact additionally supports the shearing position of the bolt 20, which is oriented perpendicular to the separating plane E, such that the bolt 20 can be sheared off in the region of the separating plane E in the course of the further pivoting motion of the plier limbs 2 and 3 by moving the outer edges 22 and 26 forming the shearing edges toward one another. The subsequently resulting cut surface on the bolt 20 is essentially aligned perpendicular to the longitudinal bolt axis (compare to FIGS. 11 and 12).

The thread runout of the thread formation 30 into the associated outer edge 26 in the first shearing region 27 has a sharp edge. A sharp-edged outer edge 26 prevents the formation of burrs on the bolt 20 during a shearing process.

In the course of the use of the pliers 1 for shearing off bolts 20 or the like, bulging of the cutting edges may occur over time in the region of the outer edges 22 and/or 26 that act upon the bolt 22 be sheared off. In order to offer durable pliers 1 in this respect, depressions 31 and 32 are provided in the respective plier limb 2, 3, wherein said depressions are associated with the outer edges 26 and 22 and lie opposite of one another referred to the separating plane E. Each depression 31, 32 is essentially realized similar to an oblong hole and extends along a circular line—referred to the axis of rotation x. The respective outer edge 22 or 26 moves at least outside the opposite cavity 18, 19 or 18', 19' in the course of the pivoting motion of the plier limbs in the region of the respective opposite depression 31 or 32.

The depth of each depression 31, 32 measured in the extending direction of the axis of rotation x may correspond to between one-hundredth and one-tenth of the height h of the respective first cavity 18 or 18'.

As a result of this design, the outer edges 22 and 26 forming the cutting edges are exposed in any pivoting position of the plier limbs.

The cavities of a pair of cavities may furthermore be positioned in such a way that the cutting outer edges 22 and 26 are not completely superimposed or do not completely converge when the pliers 1 are closed. In such an embodiment, the outer edges 22 and 26 in fact remain in a position, in which they are still slightly spaced apart from one another, in the closed position of the pliers. This spacing may amount to a few tenths of a millimeter such that bolts of a tough material such as special steel can nevertheless be completely severed.

It is furthermore preferred that particularly the outer edges 22 and 26 are hardened, preferably by means of laser hardening, in order to achieve a sound wear resistance and a low break-out risk of the outer edges 22 and 26.

The preceding explanations serve for elucidating all inventions that are included in this application and respectively enhance the prior art independently with at least the following combinations of characteristics, wherein two, multiple or all of these combinations of characteristics may also be combined with one another, namely:

Pliers, which are characterized in that a thread formation 29, 30 is provided in the first cavity 18, 18' over only part of the height h and over only part of the inner circumference of the first cavity 18, 18'.

Pliers, which are characterized in that two circumferentially opposite thread formations 29, 30 are provided over the height h of the first cavity 18, 18'.

Pliers, which are characterized in that the circumferentially opposite thread formations 29, 30 of the first cavity 18, 18' are arranged offset in height.

Pliers, which are characterized in that the first cavity 18, 18' is realized with a cylindrical inner surface 28.

Pliers, which are characterized in that a longitudinal cylinder axis y of the inner surface 28 includes in a projection an acute angle $\beta$ with the axis of rotation x.

Pliers, which are characterized in that the thread formations 29, 30 extend with respect to a respective root of the thread in alignment with the axis of rotation x of the plier limbs 2, 3.

Pliers, which are characterized in that the second cavity 19, 19' has two inner edges 24, 25 that extend differently of one another in a cross section.

Pliers, which are characterized in that a first inner edge 24 extends in a projection in alignment with the axis of rotation x and the second inner edge 25 includes an acute angle $\alpha$ between 10 and 30° with the axis of rotation x.

Pliers, which are characterized in that the second cavity 19, 19' is free of thread formations.

Pliers, which are characterized in that a cavity 18, 18', 19, 19' is with respect to a cross section provided with a depression 31, 32, which is aligned along the separating plane E, opposite of the shearing region 23, 27 of the outer edge 22, 26 of the other cavity.

Pliers, which are characterized in that the depression 18, 18', 19, 19' is realized similar to an oblong hole.

Pliers, which are characterized in that a depression 31, 32 is formed on both cavities 18, 18', 19, 19'.

Pliers, which are characterized in that the depressions 31, 32 are formed opposite of one another referred to a cross section.

Pliers, which are characterized in that the depressions 31, 32 extend along a circular line referred to the axis of rotation x.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Pliers
2 First plier limb
3 Second plier limb
4 Articulation region
5 Articulation pin
6 Handle region
7 Handle region
8 Plier jaw
9 Flat jaw region
10 Stripping region
11 Cutting formation
12 Cutting region
13 First cutting edge
14 Second cutting edge
15 Burner hole
16 Cutting region
17 Crimping region
18 First cavity
18' First cavity
19 Second cavity
19' Second cavity
20 Bolt
21 External thread
22 Outer edge
23 Second shearing region
24 First inner edge
25 Second inner edge
26 Outer edge
27 First shearing region
28 Inner surface
29 Thread formation
30 Thread formation
31 Depression
32 Depression
h Height
x Axis of rotation
y Longitudinal cylinder axis
E Shearing/separating plane
L Longitudinal axis
U Overlap region
α Angle
β Angle

The invention claimed is:

1. Pliers (1) comprising a first plier limb (2) and a second plier limb (3), which are held rotatably relative to one another about an axis of rotation (x) in an articulation region (4), wherein the plier limbs form handle regions (6, 7) on one side of the articulation region (4) and a plier jaw (8) on the other side, wherein said plier limbs (2, 3) are designed for shearing off a threaded bolt (20) in an overlap region (U) by first and second cavities (18, 18', 19, 19') that are configured to be superimposed in alignment, wherein a thread formation (29, 30) is provided in the first cavity (18, 18'), wherein the thread formation (29, 30) is provided over only part of a height (h) and the first cavity (18, 18') is realized with a cylindrical inner surface (28), and wherein a longitudinal cylinder axis (y) of the cylindrical inner surface (28) includes an acute angle with an axis of rotation (x), wherein two circumferentially opposite thread formations (29, 30) are provided and arranged offset in height, wherein the thread formations (29, 30) are provided over only part of an inner circumference of the first cavity (18, 18'), and wherein the thread formations (29, 30) extend with respect to a root of a thread in alignment with the axis of rotation (x).

2. The pliers according to claim 1, wherein the second cavity (19, 19') has two inner edges (24, 25) that extend differently from one another in a cross section.

3. The pliers according to claim 2, wherein a first inner edge (24) extends in a projection in alignment with the axis of rotation (x) and the second inner edge (25) includes an acute angle (α) between 10 and 30° with the axis of rotation (x).

4. The pliers according to claim 1, wherein the second cavity (19, 19') is free of thread formations.

5. Pliers (1) comprising a first plier limb (2) and a second plier limb (3), which are held rotatably relative to one another about an axis of rotation (x) in an articulation region (4), wherein the plier limbs form handle regions (6, 7) on one side of the articulation region (4) and a plier jaw (8) on the other side, wherein said plier limbs (2, 3) are designed for shearing off a threaded bolt (20) in an overlap region (U) by first and second cavities (18, 18', 19, 19') that are configured to be superimposed in alignment, wherein a thread formation (29, 30) is provided in the first cavity (18, 18'), wherein both cavities (18, 18', 19, 19') are provided with a depression (31, 32), each depression being aligned along a separating plane (E), opposite of a shearing region (23, 27) of an outer edge (22, 26) of the other cavity, and wherein the depressions (31, 32) are formed opposite of one another with respect to a cross section such that the outer edges (22, 26) of the cavities (18, 18', 19, 19'), which form the cutting edges are exposed in any pivoting position of the plier limbs.

6. The pliers according to claim 5 wherein the depressions (31, 32) are realized in the form of oblong.

7. The pliers according to claim 6, wherein the depressions (31, 32) extend along a circular line referred to the axis of rotation (x).

* * * * *